Aug. 11, 1953 — C. F. TEICHMANN — 2,648,828
MICROPHONE
Filed April 13, 1949
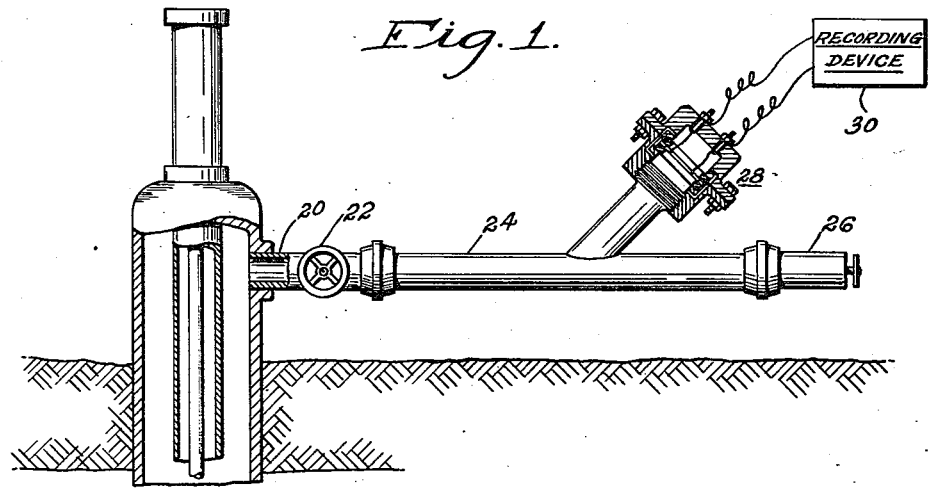
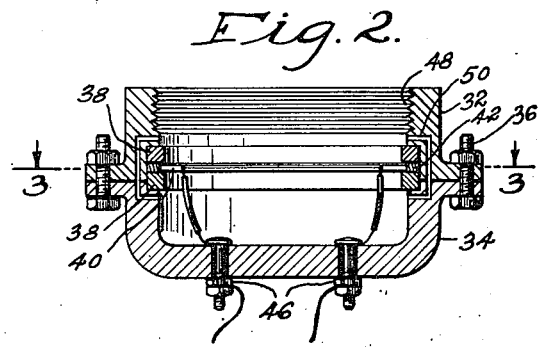
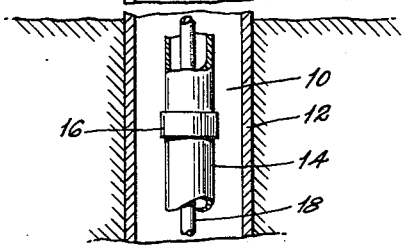
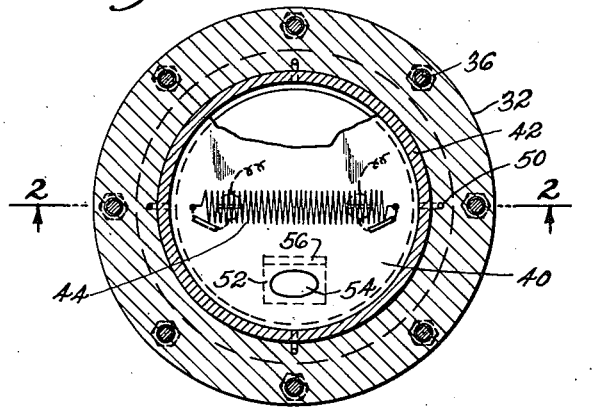
INVENTOR.
CHARLES F. TEICHMANN
BY
ATTORNEYS

UNITED STATES PATENT OFFICE 2,648,828

MICROPHONE

Charles F. Teichmann, Crestwood, N. Y., assignor to Texaco Development Corporation, New York, N. Y., a corporation of Delaware Application April 13, 1949, Serial No. 87,168

1 Claim. (Cl. 340—13)

This invention relates to microphones and more particularly to a device of this type which is responsive to compressional waves passing through a gaseous medium. The principal object of the invention is to provide a device which is sensitive to very weak waves or impulses and which is also sensitive over a very wide range of frequencies. Another object of the invention is to provide a device of this type which comprises but one moving part and which is, therefore, simple to manufacture and rugged in use.

In the "sounding" of a well, i. e., the determination of the liquid level in the well, it is common to generate a sound or compressional wave in a pipe or tube connected to the upper end of the well casing and to detect reflections of this wave caused by the original wave striking obstructions in the well such as the collars connecting adjacent sections of tubing, as well as the liquid in the well. In other words, as the sound wave travels downwardly through the well, a part of the wave is reflected upwardly by each tubing collar until the original wave reaches the surface of the liquid in the well, whereupon a larger portion of the remaining original wave is also reflected upwardly. A microphone connected to the upper end of the well casing detects these reflections from the tubing collars as well as the reflection from the face of the liquid. One can count the number of the reflections from the tubing collars which are detected from the instant of the generation of the wave until the reflection from the liquid face is received and by multiplying the number of tubing sections by the average length of a tubing section an accurate determination can be had as to the depth of the liquid level in the well.

It is desirable that the microphones used for detecting the sound waves passing upwardly through a well should be responsive to a wide range of frequencies. Microphones of the electromagnetic type have been used and these devices usually comprise a metal diaphragm in contact with the gaseous medium in the well and a coil connected to the diaphragm and movable therewith in an electrical field so that with each movement of the diaphragm an electrical current is generated which can be amplified and recorded. A microphone of this type for use in well sounding is disclosed in the U. S. Letters Patent to J. T. Kremer, No. 2,403,535. Most of the microphones of the electromagnetic type are fairly sharply resonant at some frequency and it is very difficult to design such an instrument which is substantially non-resonant over a wide range of frequencies.

Experiments have shown that where a coil or length of fine wire, the electric resistance of which varies as the wire is stretched or contracted, is affixed to a flexible, resilient diaphragm of a material such as rubber, and the diaphragm exposed to compressional waves, the resistance of the wire will vary sharply each time the diaphragm moves due to the impact of a wave and these variations can be recorded. Experiments have also shown that with such an arrangement the device is substantially non-resonant and is therefore sensitive to waves of a wide frequency range.

In accordance with this invention a microphone is provided, as stated above, comprising a housing member across which a diaphragm of the type described is placed so as to be in the path of compressional waves in a gaseous medium.

It is preferred that the microphone structure consists of a flexible, resilient, moisture-resistant diaphragm so constructed that it will not become permanently deformed after repeated flexing. There are many resilient plastics such, for example, as natural rubber and the artificial rubbers, including those that are resistant to oil, which will be satisfactory for this purpose. This class of materials is particularly valuable in the construction of diaphragms in which the electrical wire elements are imbedded in the plastic. There are many other materials which will also fulfill the requirements for the diaphragm including chamois and oil treated leathers, as well as certain textiles such as natural silk and nylon, which are either naturally water-resistant or which have been rendered water-resistant by suitable treatment. It is also contemplated that any of these materials may be metallized with a thin coating, preferably of one of the noble metals to maintain constant their moisture content without seriously altering their resilience and flexibility.

A device comprising a fine wire wound in a single layer upon a thin strip of flexible, electrically insulating material is now generally termed a "strain gage" since one of the original uses of these devices was to measure the strain in an elongated member such as a rod. For this purpose, the device is usually cemented or taped to the rod in such a manner that any stretching of the rod will also cause the wire to stretch and thereby vary its electrical resistance. In the following description the electrical wire element will be referred to as a "strain gage" although it is understood that the wire need not be wound upon a strip of any material. On the contrary, the wire of the coil can be preformed and then cemented to, or imbedded in, a diaphragm of the type which has been described.

There are many ways in which a microphone element involving this invention can be formed. For example, one or more of the strain gages can be laid in a flat mold and a solution of rubber in a volatile solvent poured into the dish and the solvent caused to evaporate, leaving a rubber diaphragm having the gage or gages imbedded therein. A molten plastic can also be flowed into a mold containing one or more of the strain gage elements after which the plastic mass can be pressed into a thin sheet-like structure in a molding press. Still another method for forming the diaphragm would be to cement two sheets of rubber or rubber-like material or one sheet of rubber-like material and one sheet of a textile or leather together, with one or more strain gages placed between them. Again, a diaphragm can be constructed comprising several layers of resilient material with a strain gage or gages placed between adjacent layers and the wire elements connected together electrically either in series or in parallel. If desired, a strain gage element can be placed upon one face of a diaphragm of resilient material and then that face sprayed with a protective coating such as a solution of rubber or rubber-like plastic or with a highly flexible lacquer such as the type used, for instance, in the finishing of leather articles.

For a better understanding of the invention, reference may be had to the accompanying drawing in which:

Fig. 1 is a vertical elevation, partly in section, of a well casing to which a microphone is attached;

Fig. 2 is a lateral cross-section through a microphone embodying the invention; and Fig. 3 is a cross-section on the line 3—3 of Fig. 2, looking in the direction of the arrows.

Referring to the drawing, a well 10 provided with a casing 12 is shown as provided with a string of tubing 14, the adjacent sections or lengths of which are connected as by means of tubing collars 16. The lower end of the tubing string 14 may be connected to a well pump, not shown, adapted to be operated by a string of pump or sucker rods 18. A pipe 20, having a valve 22, is shown as connected at one end to the upper end of the casing 12 and at its other end to a Y fitting 24. Connected to one end of the Y fitting is a firing mechanism 26 of any suitable type adapted when actuated to produce a sharp explosion as by the firing of a blank cartridge. Attached to the other leg of the Y fitting is a microphone 28 involving the principles of this invention, this microphone being illustrated in greater detail in Figs. 2 and 3.

In accordance with the general purpose of the arrangement so far described, when it is desired to measure the position or depth of the liquid level in the well 10, the valve 22 is opened and the device 26 actuated to fire an explosive charge. The compressional wave from this explosion passes into the casing through the pipe 20 and downwardly through the well. Since the tubing collars 16 are somewhat larger in diameter than the tubing 14, a small portion of the compressional wave will be reflected upwardly from each of these collars. When the main wave reaches the face of the liquid in the well, another and larger portion will be reflected upwardly. The reflected portions of the wave will pass upwardly through the casing and through the pipe 20 and Y fitting 24 whereupon they will strike the diaphragm of the microphone 28 and be recorded by the device 30, preferably on a moving film strip. By counting the number of reflections from the tubing collars which appear on the strip from the time of explosion to the reception of the reflection from the liquid surface and multiplying this number by the average length of the tubing sections an accurate determination can be had of the depth of the liquid level in the well.

The microphone 28 is shown as having a housing formed of a connecting portion 32 and a back portion 34, both portions being provided with flanges adapted to be connected together as by suitable bolts 36. The housing portions 32 and 34 are cut out around their interiors to an annular space for a pair of ring members 38. As illustrated, the diaphragm 40 of the microphone is shown as comprising a disc of a flexible, resilient, moisture-resistant material such as a thin sheet of rubber. Around the periphery of the diaphragm 40 is a stiffening ring 42 which may be attached to the rubber diaphragm in any suitable manner. The ring 42 may be attached to one side or to both sides of the edge of the diaphragm and is preferably formed of some rigid material, such as, for example, metal, plastic, or one of the plastic-impregnated textiles. This ring serves as a convenient means for handling the diaphragm while the microphone is being assembled and it also holds taut the material of which the diaphram is constructed.

As shown more clearly in Fig. 3, the resistance or strain gage element 44 comprises a length of fine wire which has the property of changing its resistance as it is stretched or compressed. The wire is preferably preformed in an accordian-pleated fashion so that it will lie in one plane. The resistance element is shown as imbedded in the material comprising the diaphragm 40 although as has been stated hereinbefore, the wire element may be cemented to one side of the diaphragm or affixed thereto in any other suitable manner. Electrical leads connect the ends of the element 44 to a pair of binding posts 46 from the outer ends of which connections are made to the recording device 30.

As shown in Fig. 2, the microphone is assembled by placing the diaphragm ring between the two supporting rings 38 and by tightening the bolts 36. The device can then be attached to the leg of the Y fitting by means of the screw threads 48 and the microphone will then be in readiness for use. In order to equalize the pressures on both sides of the diaphragm cooperating ports 50 may be formed in the housing portions 32 and 34, these ports serving to connect the space in front of the diaphragm with that in the rear thereof. It is understood that the ports 50 are quite small and that they will not bypass to the rear of the diaphragm any appreciable portion of a reflected compressional wave. Another method for protecting the diaphragm would be to place one or more suitable flap valves 52 over openings 54 in the portion of the diaphragm away from the resistance element 44 so that sudden large surges of gas pressure against the diaphragm will cause these valves to open, thereby to save the diaphragm from abnormal distortion and flexing. Such a valve may comprise a small piece of rubber or the like, having greater stiffness than the material of the diaphragm 40 and cemented to the diaphragm along one edge as at 56. In normal operation the hole 54 will be closed by the valve which will open only when the diaphragm is subjected to abnormal pressure.

Although the microphone has been shown and described as applied in an arrangement for sounding a well, it is understood that it is not limited to such an application. Many other uses of the device will present themselves, particularly wherever it is desired to detect weak compressional waves over a wide range of frequencies.

Obviously many modifications and variations of the invention, as hereinbefore set forth, may be made without departing from the spirit and scope thereof, and therefore only such limitations should be imposed as are indicated in the appended claim.

I claim:

A device for measuring compressional wave vibrations in a gaseous medium, comprising a housing open at one side to expose the interior to said medium, a flexible, resilient diaphragm disposed across the interior of said housing so as to respond in movement to waves passing through the gaseous medium, an electrical wire conductor the electrical resistance of which varies in accordance with the stretching or contracting thereof, said conductor being imbedded in to said diaphragm substantially across the center thereof so that said waves in impinging on the diaphragm will distort the diaphragm to vary the length of the conductor, means connected to said conductor for indicating the variations in electrical resistance thereof produced by said distortions, and means for relieving said diaphragm from abnormal pressures in said gaseous medium comprising a normally closed valve member secured to the back of said diaphragm over an opening therein and adapted to uncover said opening when said abnormal pressures are exerted.

CHARLES F. TEICHMANN.

References Cited in the file of this patent

UNITED STATES PATENTS

| Number | Name | Date |
|---|---|---|
| 1,809,713 | Kuhnert et al. | June 9, 1931 |
| 1,836,109 | Edwards | Dec. 15, 1931 |
| 2,171,793 | Huth | Sept. 5, 1939 |
| 2,232,476 | Ritzmann | Feb. 18, 1941 |
| 2,321,322 | Ruge | June 8, 1943 |
| 2,359,245 | Ritzmann | Sept. 26, 1944 |
| 2,380,514 | Germesheusen | July 31, 1945 |
| 2,400,467 | Ruge | May 14, 1946 |
| 2,403,535 | Kremer | July 9, 1946 |
| 2,435,254 | Ramberg | Feb. 3, 1948 |
| 2,477,507 | Africano | July 26, 1949 |